US006506458B1

(12) United States Patent
Blatter et al.

(10) Patent No.: US 6,506,458 B1
(45) Date of Patent: Jan. 14, 2003

(54) METHOD FOR COATING MOTOR VEHICLE BODIES OR PARTS THEREOF

(75) Inventors: Karsten Blatter, Erftstadt (DE); Werner Lenhard, Wuppertal (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/700,651

(22) PCT Filed: Mar. 14, 2000

(86) PCT No.: PCT/EP00/02232

§ 371 (c)(1),
(2), (4) Date: Apr. 6, 2001

(87) PCT Pub. No.: WO00/58027

PCT Pub. Date: Oct. 5, 2000

(30) Foreign Application Priority Data

Mar. 25, 1999 (DE) ........................................ 199 13 442

(51) Int. Cl.[7] .................................................. C08F 2/46

(52) U.S. Cl. .................... 427/493; 427/385.5; 427/421; 427/508; 427/510; 427/512; 427/514; 427/521; 427/557; 427/558; 427/559

(58) Field of Search ................................ 427/493, 508, 427/510, 512, 514, 521, 557, 558, 559, 385.5, 421

(56) References Cited

U.S. PATENT DOCUMENTS

| | | | |
|---|---|---|---|
| 4,906,611 | A | 3/1990 | Vandenbergh et al. |
| 5,705,232 | A | 1/1998 | Hwang et al. |

FOREIGN PATENT DOCUMENTS

| | | | |
|---|---|---|---|
| DE | 8817101 | | 10/1992 |
| DE | 19533858 | A | 7/1997 |
| LU | 63503 | A | 11/1971 |

*Primary Examiner*—Bernard Pianalto
(74) *Attorney, Agent, or Firm*—Sudhir G. Deshmukh

(57) ABSTRACT

Method of lacquering a substrate by applying a clear-lacquer coating compound to a precoated substrate or a one-coat top lacquer coating compound to an optionally precoated substrate, followed by curing, the substrate being a motor-vehicle body or parts thereof, in which the substrate is subjected, after the application of the clear-lacquer coating compound or one-coat top lacquer coating compound, optionally to a drying phase and the curing is then performed by irradiation with NIR radiation having the wavelength from 760 to 1500 nm.

13 Claims, No Drawings

METHOD FOR COATING MOTOR VEHICLE BODIES OR PARTS THEREOF

BACKGROUND OF THE INVENTION

The invention relates to a method of lacquering, in particular of multi-coat lacquering motor-vehicle bodies or parts thereof using, in particular, water-based lacquers, in particular in the field of motor-vehicle repair lacquering.

For ecological reasons, attempts are being made to replace solvent-based lacquers by water-based lacquers to an increasing extent, even in the field of motor-vehicle repair lacquering. The water-based lacquers developed have already reached a quality level that makes them equal to the solvent-based lacquers in a plurality of properties. Some properties have, however, not yet reached the quality level of solvent-based lacquers. For example, the use of water-thinnable undercoat, clear and one-coat top lacquers still presents problems in ensuring.uniform lacquering quality, in particular with regard to surface properties and interlayer adhesion under varying external conditions. It is particularly difficult to achieve a reproducible drying of water-based lacquers and a uniform surface lacquering quality resulting therefrom under ambient conditions involving widely varying atmospheric humidity.

The object of the invention was therefore to provide a method of multi-coat lacquering, in particular for motor-vehicle repair lacquering, which makes it possible to achieve coatings having a high and uniform lacquering quality, in particular with regard to surface properties and interlayer adhesion, when water-based undercoat, clear and one-coat top lacquers are used. The uniform quality of the lacquering should be ensured, in particular even under widely varying ambient conditions during application, such as, for example, atmospheric humidity. The lacquering quality should likewise be uniform at critical points, such as corrugations or edges. Furthermore, hard and scratch-resistant coatings should be obtained by the method according to the invention. Associated therewith is the requirement for a good coating polishing capability and, in particular, for a good polishing capability relatively quickly after application and drying.

It has been found that this object can be achieved by the use, to which the invention relates, of NIR radiation for curing clear-lacquer coats or one-coat top lacquers on motor-vehicle bodies or parts thereof, in particular in the case of repair lacquering.

The NIR (near-infrared) radiation used according to the invention is short-wave infrared radiation having the wavelength range from about 760 to about 1500 nm, preferably 760 to 1200 nm.

SUMMARY OF THE INVENTION

The invention furthermore provides a method of lacquering a substrate by applying a clear-lacquer coating compound to a precoated substrate or a one-coat top lacquer coating compound to an optionally precoated substrate, followed by curing, the substrate being a motor-vehicle body or parts thereof, which is characterized in that the substrate is subjected, after the application of the clear-lacquer coating compound or one-coat top lacquer coating compound, optionally to a drying phase and the curing is then performed by irradiation with NIR radiation having the wavelength range from 760 to 1500 nm.

DETAILED DESCRIPTION OF THE INVENTION

The clear-lacquer coating compound or one-coat top lacquer coating compound used according to the invention may preferably be water-based. It is, however, also possible to use solvent-based coating compounds.

The method according to the invention may be, in particular, a method of multi-coat lacquering. In this case, a top lacquer coating is applied, for example, to the substrate, optionally coated with filler compounds and/or further coating compounds. Said top lacquer coating may be composed, for example, of a colouring and/or special effect producing solvent-based or water-based undercoat coating compound and a water-based clear-lacquer coating compound. The top lacquer coating may also be composed of a water-based pigmented one-coat top lacquer-coating compound. For example, the procedure may be such that, in the case of application of the top-lacquer coating compound in the form of a pigmented one-coat top lacquer, the top-lacquer coat is first subjected optionally to a drying phase and then cured by irradiation with NIR radiation and that, in the case of application of the top-lacquer coating compound in the form of an lacquer undercoat/clear-lacquer structure, a lacquer undercoat is first applied, after curing of the lacquer undercoat or in the wet-on-wet form, optionally after a drying phase, the clear-lacquer coating is applied, optionally subjected to a drying phase and then cured by irradiation with NIR radiation.

The use of NIR radiation generally to dry paints and lacquers is known. As possible applications, for example, the following fields are mentioned: the printing sector, film drying, pipe drying, wood coatings, and powder coatings. As particular advantages of the NIR technology, mention is made of the very rapid drying, in particular in the case of water-based lacquers, and the gentle drying as a result of low heating of the substrate. Nothing is known of the possible applications of this technology in motor vehicle lacquering, in particular motor-vehicle repair lacquering.

Surprisingly, it has now been found that the object of the present invention can be achieved by using NIR radiation to cure clear-lacquer and one-coat top lacquer coatings in a multi-coat structure.

The irradiation performed in the method according to the invention with NIR radiation can be performed with a conventional, high-energy NIR source. Such NIR sources are available commercially (for example from the Industrie SerVis company). These are, for example, high-power halogen sources having a radiation density of generally more than 1 $W/cm^2$, preferably more than 10 $W/cm^2$, up to, for example, 15 $MW/m^2$. The sources reach, for example, a source surface temperature (incandescent filament temperature) of over 2500 K, for example of 2500 to 3000 K. Suitable sources have, for example, an emission spectrum with a maximum between 750 and 1200 nm.

Preferably, a drying phase is included, according to the invention, before the irradiation with NIR radiation. The drying phase is performed conventionally, for example in air or by blasting with air, for example at temperatures of 10 to 80° C., in particular at room temperature. The air blasted may optionally also be heated. Various blasting systems may be used, for example hand-held blasting guns, rack-mounted or wall-mounted blasting systems. In the simplest case, drying can be achieved by standing at room temperature.

As a result of including a drying phase, it is possible to avoid blister formation on the lacquer surface that sometimes occurs with NIR irradiation in the case of direct irradiation after application.

Clear-lacquer coating compounds and one-coat top lacquer coating compounds that can be used in the method according to the invention are, for example, conventional water-based clear lacquers and one-coat top lacquers known to the person skilled in the art, such as those used in the field of motor-vehicle lacquering, in particular of motor-vehicle repair lacquering. The clear-lacquer coating compounds and one-coat top lacquer coating compounds contain water-thinnable binders. The water-thinnable binders are the conventional binders known to the person skilled in the art for this application purpose. They may, for example, be one-component or two-component water-thinnable binder systems. Preferred, however, are two-component binder systems.

Examples of one-component binder systems are those based on water-thinnable polyurethane, polyacrylate, polyester and/or alkyd resins. The one-component binder systems may, for example, be physically or oxidatively drying.

Examples of water-thinnable two-component, crosslinkable binder systems are those based on hydroxyl-functional binders, such as, for example, polyurethane polyols, polyesterurethane polyols and/or polyacrylate polyols and polyisocyanates, based on acetoacetyl-functional and (meth) acryloyl-functional binders, and based on (meth)acryloyl-functional binders or (meth)acryloyl-functional and glycidyl-functional binders and polyamines. Examples of the above mentioned binder systems are described more comprehensively in WO-A-94/03511, EP-A-358 979, EP-A-496 205 and DE-A-40 27 259.

It is likewise also possible to use water-thinnable binders that can be cured, at least partially, by means of high-energy radiation, preferably UV radiation. Preferably, these are free-radical-curable binders. The preferred free-radical-curing binders may be prepolymers, such as polymers or oligomers that contain free-radical-polymerizable olefinic double bonds, in particular in the form of (meth)acryloyl groups in the molecule. The prepolymers may be combined with reactive thinners, i.e. reactive liquid monomers.

Examples of prepolymers or oligomers are (meth) acryloyl-functional (meth)acrylate copolymers, epoxy resin (meth)acrylates, polyester (meth)acrylates, polyether (meth) acrylates, polyurethane (meth)acrylates, unsaturated polyesters, unsaturated polyurethanes or silicone (meth) acrylates with number-average molecular masses (Mn) preferably in the range from 200 to 10000, particularly preferably from 500 to 3000, and having, on average, 2 to 20, preferably 3 to 10 free-radical-polymerizable olefinic double bonds per molecule.

If reactive thinners are employed, they are used in quantities of 1 to 50 wt. %, preferably of 5 to 30 wt. %, relative to the total weight of prepolymers and reactive thinners. These are low-molecular-weight, defined compounds that may be monounsaturated, diunsaturated or polyunsaturated. Examples of such reactive thinners are: (meth)acrylic acid and their esters, maleic acid and its half-esters, vinyl acetate, vinyl ether, substituted vinyl ureas, ethylene glycol and propylene glycol di(meth)acrylate, 1,3- and 1,4-butanediol di(meth)acrylate, vinyl (meth)acrylate, allyl (meth)acrylate, glycerol tri-, di- and mono(meth)acrylate, trimethylolpropane tri-, di- and mono(meth)acrylate, styrene, vinyltoluene, divinylbenzene, pentaerythritol tri- and tetra(meth)acrylate, di- and tripropylene glycol di(meth)acrylate, hexanediol di(meth)acrylate, and also mixtures thereof.

Usable UV-curable binders are described, for example, in DE-A-41 33 290.

Lacquer undercoat coating compounds usable in the method according to the invention are, for example, conventional lacquer undercoats known to the person skilled in the art, such as those used in the field of motor-vehicle lacquering, in particular motor-vehicle repair lacquering. The lacquer undercoats may be water-based or solvent-based. Examples of solvent-based lacquer undercoats are those based on polyacrylate resins and/or polyester resins, optionally in combination with melamine resins and cellulose esters. Examples of water-based lacquers are those based on physically drying polyurethane, polyurethane/urea, polyester, polyester urethane and/or polyacrylate resins and their modifications, such as, for example, acrylated or silicon-modified polyurethane resins and/or polyester resins. Furthermore, water-based lacquers composed of chemically crosslinking binder components, for example composed of hydroxyl-group-containing binders and polyisocyanate curing agents, are suitable.

Water-thinnable binders that can be at least partially cured by means of high-energy radiation, preferably UV radiation, can likewise be used. Preferably these are free-radical-curable binders, such as those already mentioned above.

The binder systems mentioned here and suitable for lacquer undercoats, clear lacquers and one-coat top lacquers are only an exemplary enumeration. The binder systems can likewise also be substantially modified and various crosslinking mechanisms may also be combined with one another, for example a curing by means of UV radiation can be combined with a further crosslinking mechanism. Examples of the last-named combination are described in the still unpublished German Patent Application of the same Applicant P 198 187 35 and in WO-A-9800452 and DE-A-197 09 560.

The lacquer undercoat coating compounds and one-coat top lacquer coating compounds usable in the method according to the invention contain colouring and/or special-effect-producing pigments. Suitable as colour pigments are all conventional lacquer pigments of an organic or inorganic nature. Examples of inorganic or organic colouring pigments are titanium dioxide, micronized titanium dioxide, iron oxide pigments, carbon black, azo pigments, phthalocyanine pigments, quinacridone or pyrrolopyrrol pigments. Examples of special-effect-producing pigments are metal pigments, for example composed of aluminium, copper and other metals; interference pigments, such as, for example, metal-oxide-coated metal pigments, for example titanium-dioxide-coated or mixed-oxide-coated aluminium, coated mica, such as, for example, titanium-dioxide-coated mica and graphite special-effect pigments. In particular, transparent pigments may also be present in the usable clear lacquers.

The coating compounds usable in the method according to the invention may furthermore contain water as well as organic solvents and conventional lacquer additives.

The organic solvents optionally present in the coating compounds are conventional lacquer solvents. These may originate from the production of binders or be separately added. In the case of water-based coating compounds, they are preferably water-miscible solvents. Examples of suitable solvents are monohydric or polyhydric alcohols, for example propanol, butanol, hexanol; glycol ethers or glycol esters, for example diethylene glycol dialkyl ethers, dipropylene glycol dialkyl ethers, each containing C1- to to C6-alkyl, ethoxypropanol, butyl glycol; glycols, for example ethylene glycol, propylene glycol and their oligomers, N-methylpyrrolidone and ketones, for example methyl ethyl ketone, acetone, cyclohexanone; aromatic or aliphatic hydrocarbons, for example toluene, xylene or linear or branched aliphatic C6–C 12-hydrocarbons.

The coating compounds may furthermore contain conventional lacquer additives. Examples of conventional lacquer additives are flow control agents, rheology-influencing agents, such as highly dispersed silica or polymeric urea compounds, thickeners, such as incipiently crosslinked polycarboxylic acid or polyurethanes, anti-foaming agents, wetting agents, anti-scratch agents, light stabilizers and curing accelerators. The additives are used in conventional quantities known to the person skilled in the art.

If binders curable by means of UV radiation are used, the top lacquer coating compounds additionally contain photoinitiators, for example in quantities from 0.1 to 5 wt. %, preferably from 0.5 to 3 wt. %, relative to the total of free-radical-polymerizable prepolymers, reactive thinners and photoinitiators. Examples of photoinitiators are benzoin and benzoin derivatives, acetophenone and acetophenone derivatives, for example 2,2-diacetoxyacetophenone, benzophenone and benzophenone derivatives, thioxanthone and thioxanthone derivatives, anthraquinone, 1-benzoylcyclohexanol, organophosphorus compounds, such as, for example, acylphosphine oxides. The photoinitiators may be used alone or in combination.

In the case of two-component coating compounds, the interactive binder components must be stored separately and can only be mixed with one another shortly before application.

In general, adjustment to spraying viscosity may be carried out, if necessary, prior to application with water or organic solvents.

The coating compounds in the method according to the invention may be applied by conventional methods, preferably by means of spray application.

Conventionally, the top coatings are applied from a colouring and/or special-effect-producing solvent-based or water-based undercoat coating compound and a water-based clear-lacquer coating compound or from a water-based pigmented one-coat top lacquer coating compound to substrates optionally coated with fillers and/or further coating compounds. Suitable as substrates are metal substrates and plastic substrates, in particular the substrates known in the automobile industry, such as, for example, iron, zinc, aluminium, magnesium, stainless steel or their alloys, and polyurethanes, polycarbonates or polyolefins. A filler layer is conventionally first applied to the optionally pretreated and/or precoated substrates and cured.

The top lacquer coat can then be applied to the filler layer. In the case of a top lacquer layer composed of a lacquer undercoat coating compound and a clear-lacquer coating compound, the lacquer undercoat is applied first. The lacquer undercoat can be cured at room temperature or be force-cured at, for example 40 to 80° C. The lacquer undercoat may, however, also be overlacquered in a wet-on-wet process with the clear lacquer, optionally after a drying phase and then cured together with the clear lacquer. In particular if water-based lacquers are used, the procedure may also preferably be to dry the applied lacquer undercoat by means of NIR radiation. The more precise procedure for NIR irradiation is explained below.

The clear lacquer is then applied. In accordance with the preferred embodiment, the application of the clear lacquer is followed by a drying phase, for example within 5 to 45 minutes, preferably 15 to 40 minutes, at, for example, 10 to 80° C., preferably at room temperature. The drying phase is followed by the irradiation with NIR radiation. In this process, the irradiation may be performed, for example, in a conveyor system equipped with an NIR source or with an NIR source that is positioned in front of the object to be irradiated or the area to be irradiated.

The first-mentioned possibility is suitable in the case of repair lacquering of individual parts, in which connection the belt speed and consequently the irradiation time can be varied. For example, belt speeds of 1.0 to 7.0 m/min can be set, which may correspond, for example, to irradiation times of from 2 to 20 s. The distance between NIR source and object surface may be, for example, 10 to 60 cm.

In the case of the second possibility, the NIR source is positioned in front of the object to be irradiated or the area to be irradiated. The irradiation time may be, for example, 1 to 300 s and the object distance, for example, 5 to 60 cm.

Various object temperatures may be set by controlled selection of the various parameters, such as conveyor speed, irradiation time and object distance, and, of course, as a function of the radiation power of the NIR source used. For example, object temperatures from 80 to 150° C. can be set.

After irradiation of the clear-lacquer coat with NIR radiation, curing is complete.

Only if binders curable by means of high-energy radiation are used is a UV irradiation also added. For this purpose, UV radiation sources having emissions in the wavelength range from 180 to 420 nm, in particular from 200 to 400 nm, are preferably used. Suitable UV radiation sources and the UV technology are part of the prior art and are known to the person skilled in the art.

In the case of a top lacquer coating composed of a one-coat top lacquer coating compound, the one-coat top lacquer is applied to the substrate, preferably to the filler coat. The application of the one-coat top lacquer may preferably be followed by a drying phase, as described above. The drying phase is followed by radiation with NIR radiation. In this process, the irradiation can be performed, for example, in a conveyor system equipped with an NIR source or with an NIR source that is positioned in front of the object to be irradiated or the area to be irradiated. If binders curable by means of high-energy radiation are used, a UV irradiation must also be added, as already described above.

An advantageous development of the method according to the invention is to cure the applied filler coat likewise with NIR radiation. In this case, it is possible, after applying, for example, an aqueous filler coating compound, first to subject the filler coat, after an optionally provided drying phase, to a drying by irradiation with NIR radiation. The final curing can then be performed by a suitable curing method. The final curing can be performed, for example, at room temperature or forced at higher temperatures, by irradiation with UV or IR or NIR radiation. Preferably the final curing is performed with UV or NIR irradiation.

It is, however, also possible to perform the curing of the filler coat after an optionally provided drying phase only with a single NIR irradiation phase.

The method according to the invention is preferably used in motor-vehicle lacquering and motor-vehicle parts lacquering, in particular in motor-vehicle repair lacquering. It is, however, also possible, to use the method according to the invention in motor-vehicle series lacquering, in particular in repair lacquerings in the motor-vehicle series lacquering.

Top lacquer coats having a uniform, reproducible quality with regard to interlayer adhesion and surface properties can be achieved with the method according to the invention even under varying external conditions, in particular in the case of widely varying atmospheric humidity. Likewise, a uniform quality of lacquering is also ensured at critical areas such as corrugations or edges. The top lacquer coatings have a very good hardness and scratch resistance. After a short time, they can be polished very well. Also advantageous, of course, is the extremely short drying or curing time, respectively, that is achieved with the method according to the invention. The extremely short drying or curing time, respectively, is not substantially impaired by the drying phase that is to be optionally provided and that occurs also in the case of a conventional lacquering process with curing, for example, in an oven. The throughput times, for example, in a repair lacquering workshop can thereby be substantially shortened, which improves the efficiency of the workshop as a whole.

The time factor may also play a substantial role in repair lacquerings in motor vehicle series lacquering.

The invention will be explained in greater detail by reference to the following examples.

EXAMPLE 1

A water-based lacquer (produced according to DE-A-196 43 802, Production Example 4) was applied to a mudguard, coated with a commercial two-component (2C) filler coating compound, of a motor vehicle in a resultant dry film coat thickness of 13 to 15 $\mu$m. After a drying phase of 25 minutes at room temperature, a water-based clear lacquer based on an OH-functional polyurethane resin and a polyisocyanate curing agent (produced according to WO-A-94/03511, Example 11) was applied in a resultant dry-film coat thickness of 50 $\mu$m. A drying phase of 35 minutes at room temperature was followed by irradiation with an NIR source (500 W/cm$^2$). The source/object distance was 10 cm and the irradiation time was 6 s.

EXAMPLE 2

A water-based lacquer (produced according to DE-A-196 43 802, Production Example 4) was applied to a mudguard, coated with a commercial 2C filler coating compound, of a motor vehicle in a resultant dry film coat thickness of 13 to 15 $\mu$m. A drying time of 10 minutes was followed by irradiation with a NIR source (500 W/cm$^2$). The source/object distance was 10 cm and the irradiation time was 6 s. Then a water-based clear lacquer based on an OH-functional polyurethane resin and a polyisocyanate curing agent (produced according to WO-A-94/03511, Example 11) was applied in a resultant dry film coat thickness of 50 $\mu$m. A drying phase of 35 minutes at room temperature was followed by irradiation with an NIR source (500 W/cm$^2$). The source/object distance was 10 cm and the irradiation time was 6 s.

Comparison Example

The procedure was analogous to Example 1, with the sole difference that the applied clear lacquer, after a drying phase of 35 minutes, was cured for 60 minutes at 60° C.

Comparison of the Lacquering Results

The mudguards lacquered in accordance with Examples 1 and 2 exhibit a homogeneous, uniform optical surface quality with regard to body, gloss and flow, whereas these properties are formed unsatisfactorily at corrugations and edges in accordance with the comparison example.

| | Example 1 | Example 2 | Comp. Example |
|---|---|---|---|
| Polishing capability after 30 minutes | satisfactory | satisfactory | Unsatisfactory |
| after 24 h | Satisfactory | satisfactory | satisfactory |
| Hardness (finger-nail test) (immediately after curing) | very good | very good | good |

What is claimed is:

1. A method of lacquering a substrate which comprises the steps of:
   (a) spraying a lacquer coating compound on a precoated substrate, wherein the lacquer coating compound is selected from the group consisting of a clear lacquer coating compound and a one-coat top lacquer coating compound, wherein the precoated substrate is a motor-vehicle body or part thereof; and
   (b) curing the lacquering coating compound with NIR radiation having a wavelength range from 760 to 1500 nm.

2. The method according to claim 1, wherein said method further includes subjecting the lacquer coating applied in step (a) to a drying phase, wherein said drying phase occurs before the lacquer coating is cured in step (b).

3. The method according to claim 2, wherein the drying phase occurs for 5 to 45 minutes at a temperature ranging from 10 to 80° C.

4. The method according to claim 2, wherein the drying phase occurs at room temperature.

5. The method according to claim 1, wherein said method further includes subjecting the one-coat top lacquer coating compound to a drying phase, wherein said drying phase occurs before the one-coat top lacquer coating is cured in step (b).

6. The method according to claim 5, wherein the drying phase occurs for 5 to 45 minutes at a temperature ranging from 10 to 80° C.

7. The method according to claim 5, wherein the drying phase occurs at room temperature.

8. The method according to claim 1, wherein the lacquer coating compound comprises a water-based coating compound.

9. The method according to claim 1, wherein the clear lacquer coating compound of step (a) is applied to a lacquer undercoating, wherein said lacquer undercoating is cured before applying the clear lacquer coating compound of step (a).

10. The method according to claim 9, wherein the clear lacquer coating compound of step (a) is applied to the lacquer undercoating in a wet-on-wet process.

11. The method according to claim 1, wherein said method comprises repair lacquering of motor-vehicle bodies or parts thereof.

12. The method according to claim 1, wherein the lacquer coating compound is comprised of binders, said binders being curable by high-energy UV radiation.

13. The method according to claim 1, wherein said method further includes curing the lacquer coating compound of step (a) with UV radiation after being cured in step (b) with NIR radiation, said lacquer coating compound being comprised of binders curable by high-energy UV radiation.

* * * * *